March 1, 1955 R. A. BEAGLE 2,703,115
TILTING TRACK TABLE SAW
Filed Aug. 12, 1952 3 Sheets-Sheet 1
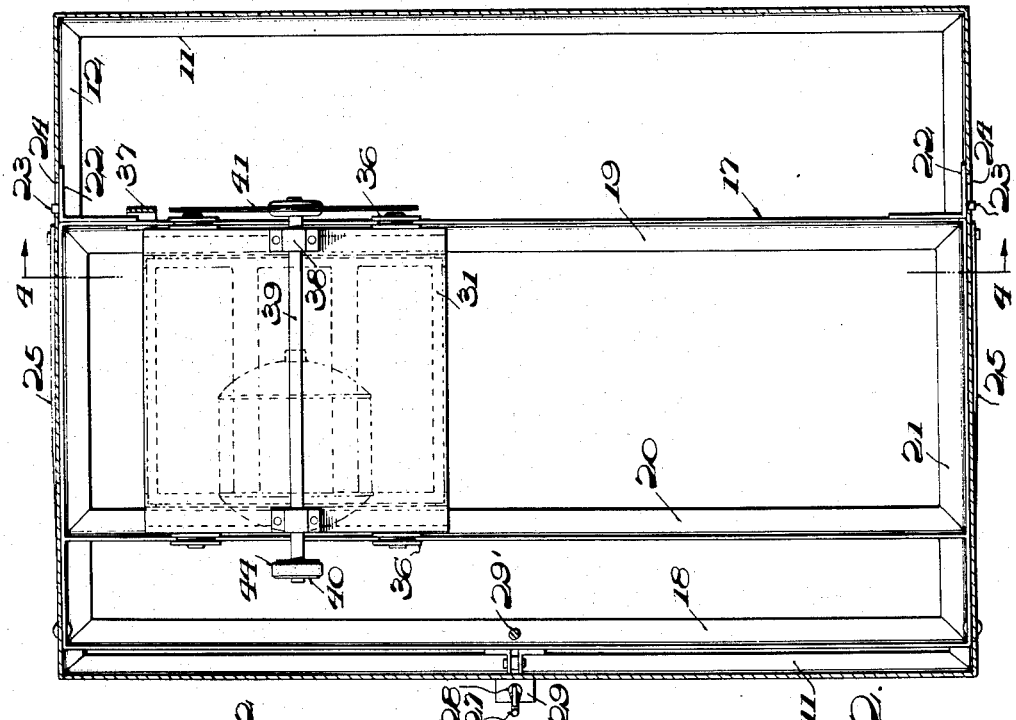
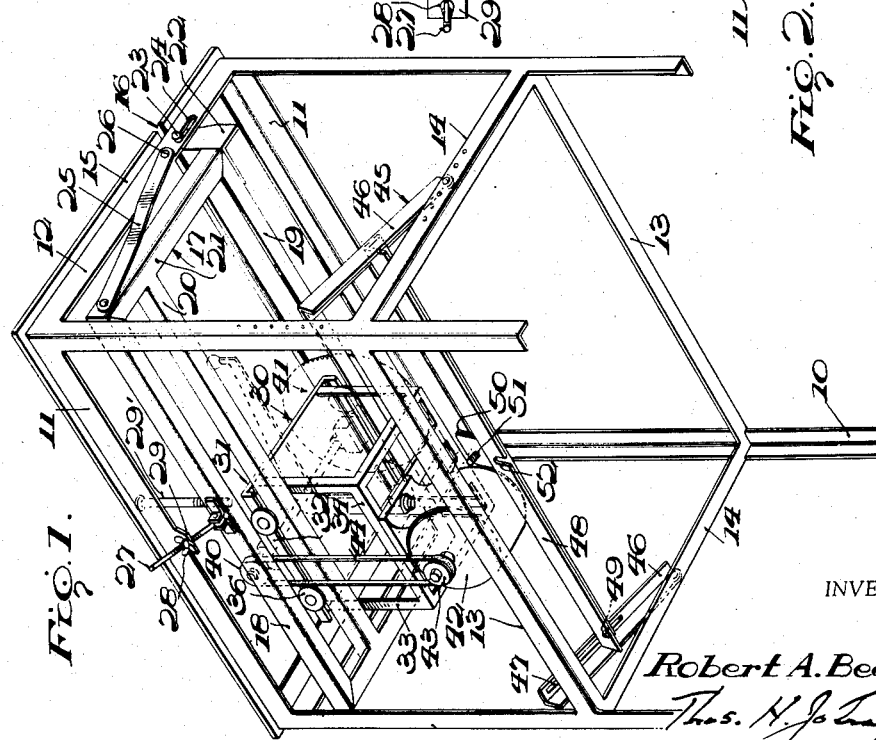
INVENTOR
Robert A. Beagle
Thos. H. Johnston
ATTORNEY

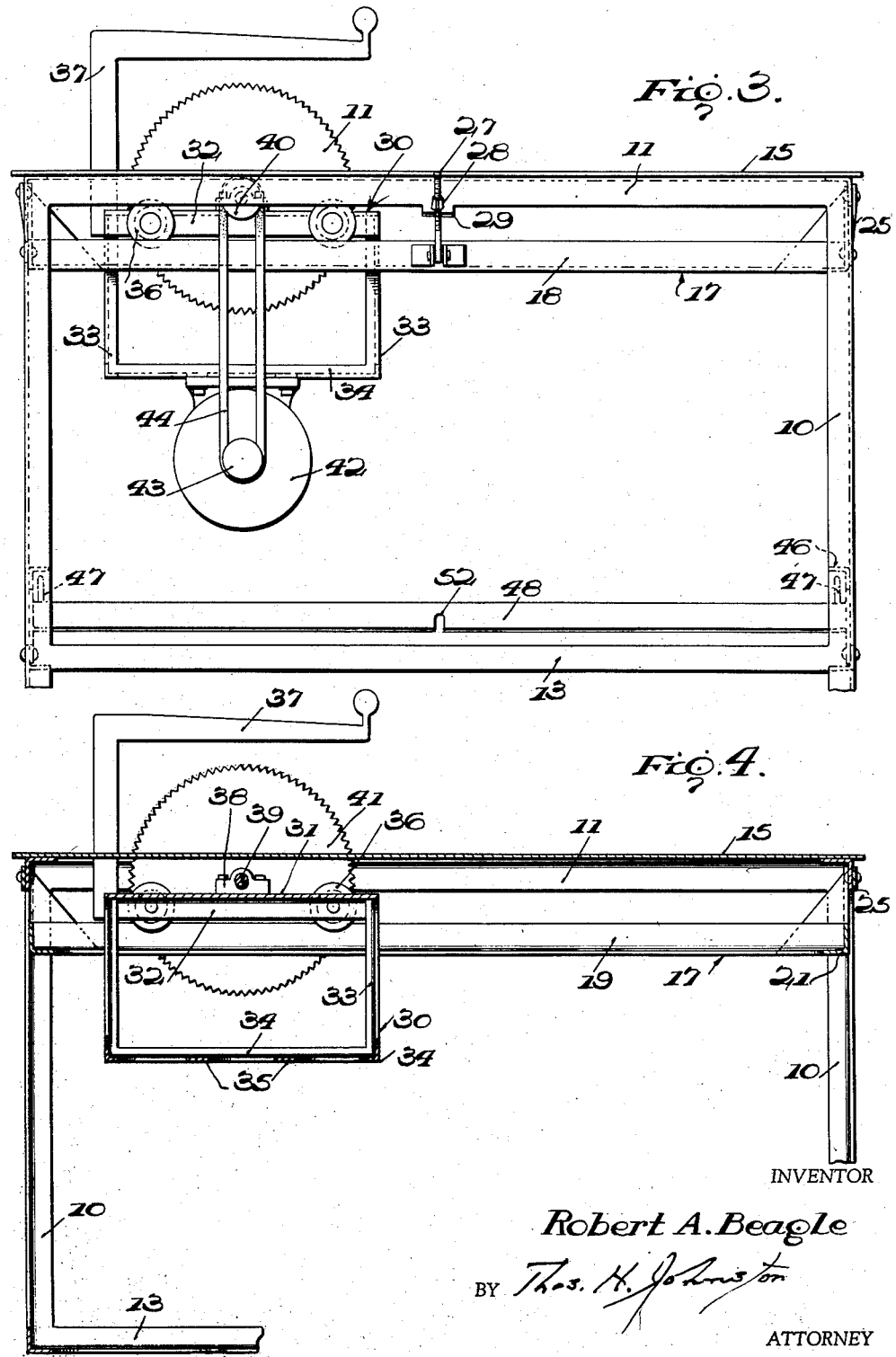

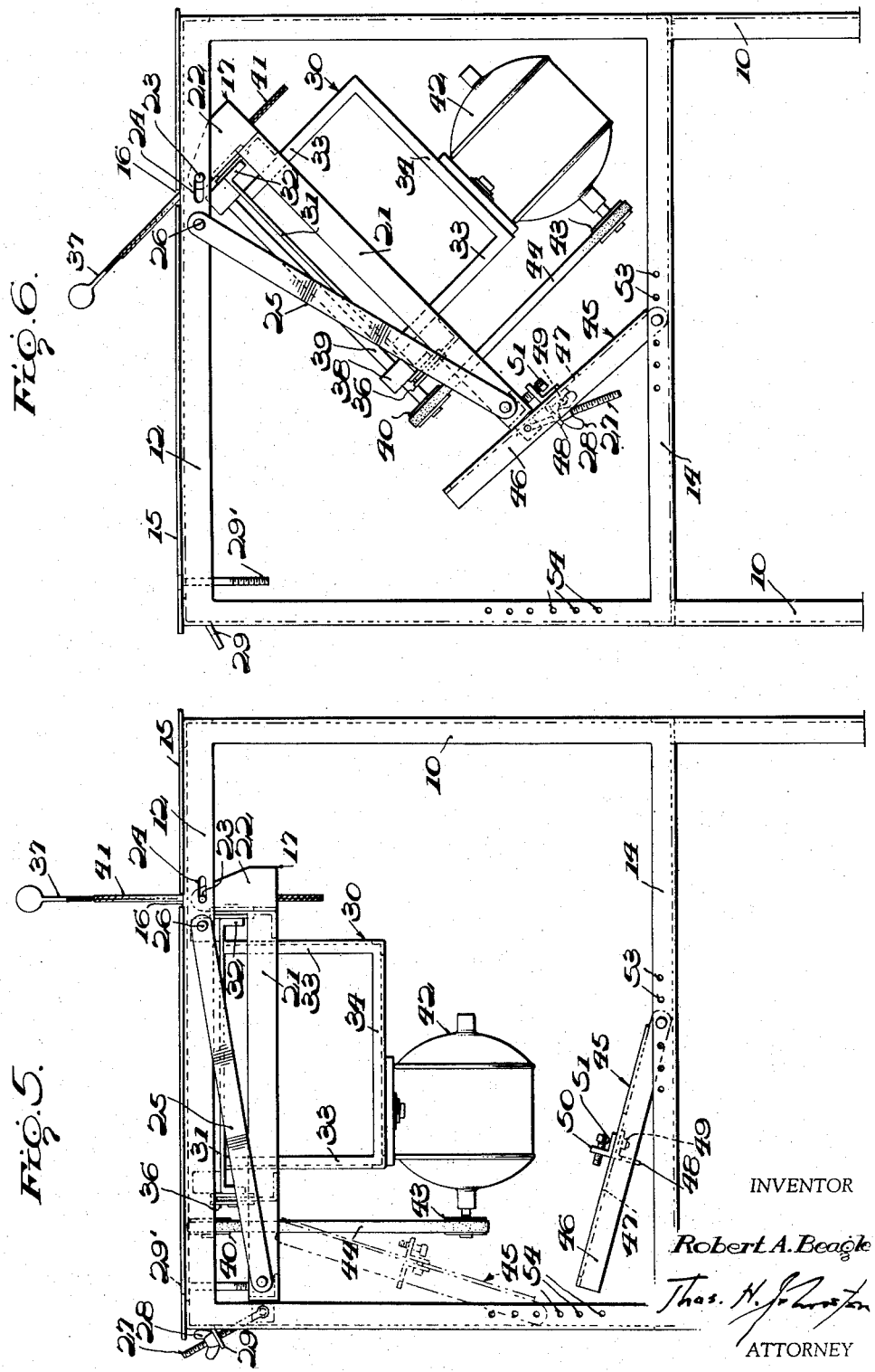

United States Patent Office 2,703,115
Patented Mar. 1, 1955

2,703,115

TILTING TRACK TABLE SAW

Robert A. Beagle, Kelso, Wash.

Application August 12, 1952, Serial No. 303,878

5 Claims. (Cl. 143—36)

This invention relates to an improved tilting track table saw.

In devices of this kind, the table top is, as is well known, usually formed with a slot through which the saw projects, and in any instance where the saw is mounted for tilting adjustment, so that angle cuts may be made, and is mounted to swing about a fixed center, it is necessary to provide a wide slot in order to accommodate the tilting movement of the saw. However, for many reasons not necessary to enumerate, a wide slot has many practical disadvantages.

It is therefore an object of the present invention to provide a table saw wherein the slot in the table top will be more narrow than usual for given maximum tilting movement of the saw.

Another object of the invention is to provide a table saw wherein the saw will, as it is tilted, be shifted laterally relative to the slot in the table top, thus to require a slot of minimum width to accommodate the maximum tilting movement of the saw, and wherein the ratio of lateral movement of the saw with respect to the tilting movement thereof will be fixed and constant.

Still another object of the invention is to provide a table saw embodying a track for the saw carriage, wherein said track will be hinged at its rear side by a pair of studs adapted to travel in slots in the table frame laterally with respect to the slot in the table top, so that the center of tilting movement of the track may be shifted, wherein a pair of links will be employed to hinge the track at its forward side, and wherein said links will be of less radius than the radius of the track and mounted to swing about fixed centers on the table frame, thus to shift the track laterally as it is tilted on said studs.

And the invention seeks, as a still further object, to provide a table saw embodying novel means for securing the track in normal horizontal position, or in precisely adjusted tilted position.

Other and incidental objects of the invention will appear during the course of the following description thereof, and in the drawings:

Figure 1 is a perspective view looking up under the table saw so as to better show the parts disposed beneath the top of the table.

Figure 2 is a horizontal section taken immediately beneath the table top.

Figure 3 is a fragmentary elevation looking at what may well be termed the front side of the table.

Figure 4 is a vertical section on the line 4—4 of Figure 2.

Figure 5 is an end elevation showing the saw in normal horizontal position.

Figure 6 is an end elevation showing the saw tilted.

In carrying the invention into effect, I employ an oblong table frame embodying legs 10 connected at their upper ends by front and rear side bars 11, and end bars 12. Extending between the several legs near their lower ends are side reach bars 13, and end reach bars 14. The legs, as well as the side and end bars at the upper ends of the legs, and all of the reach bars, are preferably formed of suitable angle irons welded or otherwise appropriately secured together. Fixed to the bars 11 and 12 is a preferably metal table top 15, and formed in said top near the rear side of the table is a longitudinal saw slot 16 extending from end to end of the table top.

Mounted to swing within the table frame, as perhaps best seen in Figure 2 of the drawings, is an oblong saw carriage track, indicated as a whole at 17. This track includes a front side bar 18, a like rear side bar which, as will later appear, forms one rail 19 of the track, and a companion intermediate bar which forms the other rail 20 of the track. Connecting the bars 18, 19, and 20 are end bars 21. All of the bars of the track are preferably formed of suitable angle irons welded or otherwise appropriately secured together.

Fixed to the track 17 at its rear corners are upstanding hinge plates 22 to the upper end portions of which are fixed laterally projecting pivot studs 23, and formed in the end bars 12 of the table frame are longitudinal slots 24 snugly but slidably accommodating said studs for lateral travel therein longitudinally of the slots. The track 17 is thus hinged at its rear side, and it is to be noted, as best seen in Figures 5 and 6 of the drawings, that the slots 24 extend from a vertical plane passing medially through the saw slot 16 laterally and rearwardly with respect to said saw slot.

Pivoted at their rear ends to the end bars 12 of the table frame at points forward of the lateral slots 24 but more or less near to the forward ends of said slots are cradle links 25 mounted to swing about studs 26 located in a plane with said slots. At their forward ends, these links are similarly connected to the end bars 21 of the track 17 near the forward corners of said track. The links 25 thus mount the track 17 to swing at its forward side about the fixed center provided by the studs 26, while at its rear side said track is mounted to swing about the movable center provided by the studs 23. Thus, since the links 25 are of less radius than the radius of the track 17, said links will, as the track is swung, shift the track laterally with respect to the vertical plane of the saw slot 16. Moreover, as will be perceived, the lateral movement of the track 17 will be fixed and constant in proportion to given swinging movement of said track.

Pivoted upon the front side bar 18 of the track 17, medially of said bar, is a clamping bolt 27 which, preferably, carries a wing nut 28, and extending downwardly and forwardly from the front side bar of the table frame is a slotted lug 29, the slot of which is adapted to freely receive the bolt 27. Accordingly, as will be perceived, the nut 28 may be adjusted for securely anchoring the track 17 in normal horizontal position, and, preferably, the table top 15 carries a depending stop screw 29' disposed to engage the side bar 18 for limiting the track when swung upwardly, so that the track may be precisely leveled.

Mounted to ride upon the track 17 is a saw carriage, indicated as a whole at 30. This carriage includes a rectangular body frame comprising a top plate 31, and formed on said plate are downturned, parallel side flanges 32. Suitably fixed to the plate are depending corner bars 33 connected at their lower ends by side and end bars 34. The bars 33 and 34 are preferably formed of angle irons appropriately secured together, and extending between the side bars parallel to the end bars are spaced, flat cross bars 35.

Mounted upon the side flanges 32 of the top plate 31 are pairs of grooved rollers 36 adapted to travel upon the upstanding flanges of the rails 19 and 20 of the track 17. The rollers will thus support the carriage 30 for movement on the track longitudinally of the saw slot 16 in the table top 15, and fixed to the top plate 31 of the carriage at its inner forward corner is an upstanding L-shaped handle 37 the vertical leg of which is freely received through said slot while the other leg of the handle is disposed horizontally above said slot and is adapted to be grasped for shifting the carriage to and fro.

Fixed to the top plate 31 of the carriage 30 are aligned bearings 38 through which is journaled a transverse arbor 39, and fixed to one end of said arbor is a belt pulley 40. Fixed to the opposite end of the arbor 39 is a circular saw 41 which is freely received through the saw slot 16 in the table top 15 and is mounted in a plane with the handle 37. Preferably, the saw 41 is readily detachable so that different saws may be easily substituted one for another on the arbor.

Bolted or otherwise detachably secured to the cross bars 35 of the carriage frame therebeneath is a suitable electric motor 42 to the armature shaft of which is fixed a belt pulley 43, and trained about the pulleys 40 and 43 is a drive belt 44. Thus, as will be understood, the motor 42 may be energized for rotatably driving the saw 41, while, concurrently, the handle 37 may be manipulated for shifting the saw carriage 30 and feeding the saw into the work.

Mounted to swing upon the end reach bars 14 of the table frame is a stop rest, indicated as a whole at 45. This rest includes a pair of legs 46 of suitable angle irons. Near the lower ends of the legs corresponding flanges thereof are removably bolted to said reach bars, and formed in the opposite corresponding flanges of said legs are longitudinal slots 47. Slidably fitting between the legs is a cross bar 48, also of suitable angle iron. One flange of said cross bar rests flat against the slotted flanges of the legs, and extending through said flange of the cross bar freely through the slots 47 are bolts 49. As will be grasped, the cross bar 48 is thus adjustable longitudinally of the legs to vary the height of said bar. Fixed to the cross bar 48 medially thereof is an angle plate 50 through which is adjustable a stop screw 51, and formed in the forwardly disposed flange of the cross bar opposite said stop screw is a notch 52. When not in use, the stop rest 45 may, as suggested in Figures 1 and 5 of the drawings, be swung down to a position out of the way.

Formed in each of the end bars 14 of the table frame is a series of longitudinally spaced openings 53 any corresponding pair of which is adapted to removably receive the bolts pivoting the legs 46 at their lower ends. The pair of legs 10 at the forward side of the table frame is similarly provided each with a series of vertically spaced openings 54 any corresponding pair of which is likewise adapted to removably receive said bolts. Thus, as will be understood, the stop rest 45 may be adjusted longitudinally of the reach bars 14 or vertically of the forward pair of legs 10 to properly support the track 17 when swung down to accommodate a cut of any desired angle within the range of adjustment of said track.

In the present instance, I have shown a construction wherein the saw 41 is capable of being adjusted through a very wide angle, although, however, the exact maximum angle of adjustment is subject to choice. As seen in Figure 5 of the drawings, the saw 41 is, when in normal vertical position, disposed close to the rear longitudinal edge of the saw slot 16 in the table top 15, while the pivot studs 23 of the saw carriage track 17 are disposed at the forward ends of the slots 24 in the table frame.

Assuming now that it is desired to swing the saw 41 to a forty-five degree angle, as shown in Figure 6 of the drawings, for making such a cut, the stop rest 45 is swung up to the position shown, when the bolt 27 is released and the saw carriage track 17 swung down until the front side bar 18 of said track rests against the stop screw 51. The bolt 27 is then engaged in the notch 52 of the cross bar 48 and the nut 28 adjusted for firmly clamping the saw carriage track in angular position. As will be appreciated, the cross bar 48 of the stop rest 45 is first adjusted on the legs 46 to suit the desired angular tilt of the saw. However, the stop screw 51 is provided for obtaining a precise adjustment of the saw carriage track 17 and hence the saw itself. As will be grasped, this precise adjustment of the track 17 may be obtained, in conjunction with adjustment of the stop rest 45 as well as adjustment of the cross bar 48, at any angle of said track within the range of angular adjustment thereof.

As the saw carriage track 17 is swung down, the links 25 will shift said track laterally and rearwardly with respect to the saw slot 16, as previously described, until, when the saw is disposed at a forty-five degree angle, the pivot studs 23 rest in the rear ends of the slots 24 in the table frame. Thus, as will be seen, the center of rotation of the saw is also shifted laterally and rearwardly relative to the plane of the saw slot, as the saw is tilted, so that a saw slot of minimum width is required for given maximum tilt of the saw.

The motor 42, which in most instances will be quite heavy, will provide a weight tending to maintain the rollers 36 of the saw carriage 30 in firm engagement with the rails 19 and 20 of the track 17, so that the saw 41 will not chatter. Moreover, it is to be noted that the corner bars 33 of the body frame of the saw carriage extend downwardly between the inwardly extending flanges of said rails extremely close thereto. The corner posts are thus disposed to coact with said rails for blocking tilting movement of the carriage independently of the track 17. The track and carriage will accordingly provide an assembly free from looseness.

Having thus described my invention, I claim:

1. In a table saw, a table frame, a swingingly and laterally movable saw carriage track, a saw carriage mounted upon said track, a saw mounted upon said carriage, the carriage and saw being laterally and swingingly movable with the track and the track being adapted to be swung for tilting the saw, coacting means pivotally connecting the track with the table frame and providing a pivotal center for the track, said coacting means comprising a portion disposed to accommodate lateral movement of said pivotal center with the track, means of less radius than the radius of the track pivotally connected to the frame and track to extend therebetween and operable to shift the track and its pivotal center laterally as the track is swung for tilting the saw, legs pivoted upon the table frame, a cross bar adjustable upon said legs and coacting therewith to provide a stop rest engageable by the track when swung for supporting the track in tilted position, and means carried by the track and engageable with the table frame for securing the track in normal horizontal position as well as engageable with the cross bar of the stop rest for fastening the track tilted.

2. In a table saw, a table frame having a fixed center thereon, a saw carriage track carried by the frame, coacting means one on the frame and the other on the track pivotally connecting the track near one side thereof with the frame at a point eccentrically of said fixed center and providing a pivotal center about which the track is hinged to tilt, and a coupling between said fixed center and the track connected with the track near its opposite side and operable to shift the track laterally when tilted, one of said means being elongated in a direction radially of the axis of said fixed center to permit movement of the other of said means in a direction radially away from said axis and accommodate lateral movement of the track when tilted.

3. In a table saw, a table frame having a fixed center thereon, a saw carriage track carried by the frame, the frame and track being provided one with a slot and the other with a coacting stud slidably and pivotally received in said slot to pivotally connect the track near one side thereof with the frame, said slot and pin providing a pivotal center about which the track is hinged to tilt, and a coupling between said fixed center and the track connected with the track near its opposite side and operable to shift the track laterally when tilted, said slot being elongated in a direction radially of the axis of said fixed center to permit relative sliding movement between the slot and pin in a direction radially away from said axis and accommodate lateral movement of the track when tilted.

4. In a table saw, a table frame having a slot therein and provided in spaced relation near one end of the slot with a fixed center disposed in alignment with the slot, a saw carriage track carried by the frame, an upstanding hinge plate fixed to the track near one side thereof and provided with a stud slidably and pivotally received in said slot to pivotally connect said side of the track with the frame, said slot and pin providing a pivotal center about which the track is hinged to tilt, and a link extending between said fixed center and the track near its opposite side and operable to shift the track laterally when tilted as well as slidably shift said pin in said slot radially away from said fixed center to accommodate said lateral movement of the track.

5. In a table saw, a table frame having a fixed center thereon, an oblong saw carriage track slidably and pivotally hinged near one longitudinal edge thereof to the frame at a point eccentrically of said center for sliding movement radially of said center as well as pivotal tilting movement relative to the frame, a coupling between said fixed center and the track near its opposite longitudinal edge and operable to shift the track laterally when tilted as well as slidably shift the hinged center of the track radially away from said fixed center to accommodate said lateral movement of the track, said track including spaced rails, a saw carriage including a frame having a top plate provided with depending side flanges, rollers mounted upon said flanges and engaging said rails to support the carriage for movement thereon, corner posts extending downwardly from said top plate between said rails and close thereto for limiting the carriage against lateral rocking movement on said rails, side and end bars extending between the lower ends of said posts, a motor carried by certain of said bars and providing a weight at the lower end of the carriage frame below said rails for holding the rollers in engagement with the rails, and a saw carried by said top plate and driven by said motor.

References Cited in the file of this patent

UNITED STATES PATENTS

| | | |
|---|---|---|
| 1,635,290 | Skoglund | July 12, 1927 |
| 1,988,102 | Woodward | Jan. 15, 1935 |
| 2,323,247 | Sellmeyer | June 29, 1943 |

FOREIGN PATENTS

| | | |
|---|---|---|
| 503,487 | Great Britain | Apr. 4, 1939 |